UNITED STATES PATENT OFFICE.

ROBERT HÜBNER, OF NEW YORK, N. Y., ASSIGNOR, BY MESNE ASSIGNMENTS, TO GEORGE HILLARD BENJAMIN, OF NEW YORK, N. Y.

COFFEE TABLET AND PROCESS OF MAKING THE SAME.

1,137,265. Specification of Letters Patent. Patented Apr. 27, 1915.

No Drawing. Application filed December 27, 1909. Serial No. 534,992.

*To all whom it may concern:*

Be it known that I, ROBERT HÜBNER, a citizen of the United States, residing at New York city, county and State of New York, have invented certain new and useful Improvements in Coffee Tablets and Processes of Making the Same, of which the following is a specification.

The object of my invention is to extract from coffee, all of the aromatic and palatable substances, and to reduce such substances to the form of a tablet, which may be preserved for any length of time, and which is readily soluble in hot water.

To carry my invention into effect I proceed as follows: The coffee beans are first roasted and then reduced to a finely divided condition by grinding. The divided mass is then subjected (1) to the action of a solvent, which will dissolve aromatic ketones, glycerids, etc., such for instance as ether or ether alcohol, which will remove the aromatic and fatty bodies. This extract (a) of the aromatic and fatty bodies thus obtained, is then separated by pressing or otherwise, from the divided mass, and the remaining mass subsequently subjected to the action of boiling water to remove the substances soluble in water, as an extract (b). The extract (a) is then, if necessary, subjected to the action of an alkali such as magnesia or soda, for the purpose of saponifying a portion of any fatty bodies which may be present in such extract. For instance, some coffees contain fatty bodies, others do not. The amount of alkali will therefore depend upon the amount of fatty bodies present. The extracts (a and b) are then combined and evaporated under such conditions as will not destroy the aromatic bodies but remove all water. The extracts (a and b) may be evaporated separately. After evaporation has been effected, the combined, concentrated extract (a and b) may be pressed into tablet form and coated with a preservative envelop. I may add any suitable carrying body, in which case I preferably use a body soluble in boiling water and which will not appreciably affect the taste of the coffee, such for instance as sugar of milk. The concentrated extract (a and b) resembles tar in its physical characteristics and the purpose of adding a carrying body or carrying bodies, is to give consistency to the mass, so that it may be more readily divided and pressed into tablet form. After compression of the concentrated extract, or the concentrated extract and the carrying body into tablets, which may be done in a well known manner, the tablets are coated with a solution of gelatin, vegetable albumen or other suitable material, soluble in boiling water. If desired, instead of pressing into tablets, the concentrated extract may be inserted directly into previously formed capsules. I may combine with the coating or body of the capsule, any suitable material which will prevent disintegration of the coating or capsule or the production of bacterial growth, such for instance as those now commonly used in the art for the purpose.

For use in hot climates I may put the tablets or capsules in preservative compounds, or seal them in boxes or in air tight jars. The tablets may be used by immersing them in hot water and boiling, as in the usual preparation of coffee.

If desired, the tablets may be made from coffee from which the caffein has been partially removed, (this is described in my Patent No. 947,577, dated January 25th, 1910) in which case the preliminary process of extracting the caffein from the raw beans is first carried out, as described in my said patent. I may omit the roasting of the coffee before grinding; instead of using two extracts (a and b) I may use a single extract (a).

Having thus described my invention, I claim:

1. The herein described process of making coffee tablets, which consists in first extracting from the coffee such aromatic ketones, glycerids, and fatty bodies, as are soluble in ether or ether-alcohol, then extracting from the mass such bodies as are soluble in water, then subjecting the first mentioned extract to the action of an alkali, then removing the saponified bodies, then combining the extracts and evaporating them to the condition of a solid.

2. The herein described process of making coffee tablets, which consists in first extracting from the coffee such aromatic ketones, glycerids, and fatty bodies, as are soluble in ether or ether-alcohol, then extracting from the coffee all matters which are soluble in hot water, then concentrating the extracts to a solid, then compressing to tablet form, then finally coating with a preservative envelop.

3. The herein described process of making coffee tablets, which consists in first grinding, then extracting from the mass such bodies as are soluble in ether or ether-alcohol, then extracting from the mass such bodies as are soluble in water, then subjecting the first mentioned extract to the action of an alkali, then removing the saponified bodies, then combining the extracts and evaporating them to the condition of a solid, then compressing into tablet form and finally coating with a preservative envelop.

4. The herein described process of making coffee tablets, which consists in first grinding, then extracting from the mass such bodies as are soluble in ether or ether-alcohol, then extracting from the mass such bodies as are soluble in water, then subjecting the first mentioned extract to the action of an alkali, then removing the saponified bodies, then combining the extracts, then evaporating them, then mixing them with a carrying body, then compressing into tablet form, and then coating them with a preservative envelop.

5. As a new article of manufacture, a coffee tablet containing all of the aromatic and palatable substances contained in coffee which may be extracted by ether or ether alcohol, and all the other bodies which may be extracted by warm water, excepting such fatty matters as may be saponified by an alkali.

6. As a new article of manufacture, a coffee tablet comprising a carrying body and all the volatile bodies which may be extracted from coffee by ether or ether alcohol, and all the other bodies which may be extracted by warm water, but free from such fatty matters as may be removed by the action of an alkali.

7. As a new article of manufacture, a dry body consisting of all the aromatic and palatable substances which may be extracted from coffee by ether or ether alcohol, and all the other bodies which may be extracted by warm water, excepting such fatty matters as may be removed by saponification by an alkali.

In testimony whereof, I affix my signature, in the presence of two witnesses.

ROBERT HÜBNER.

Witnesses:
  W. A. TOWNER, Jr.,
  HELEN E. KOELSCH.